(No Model.)
E. D. KENDALL.
PROCESS OF AND APPARATUS FOR PREPARING PETROLEUM JELLY.
No. 284,437. Patented Sept. 4, 1883.
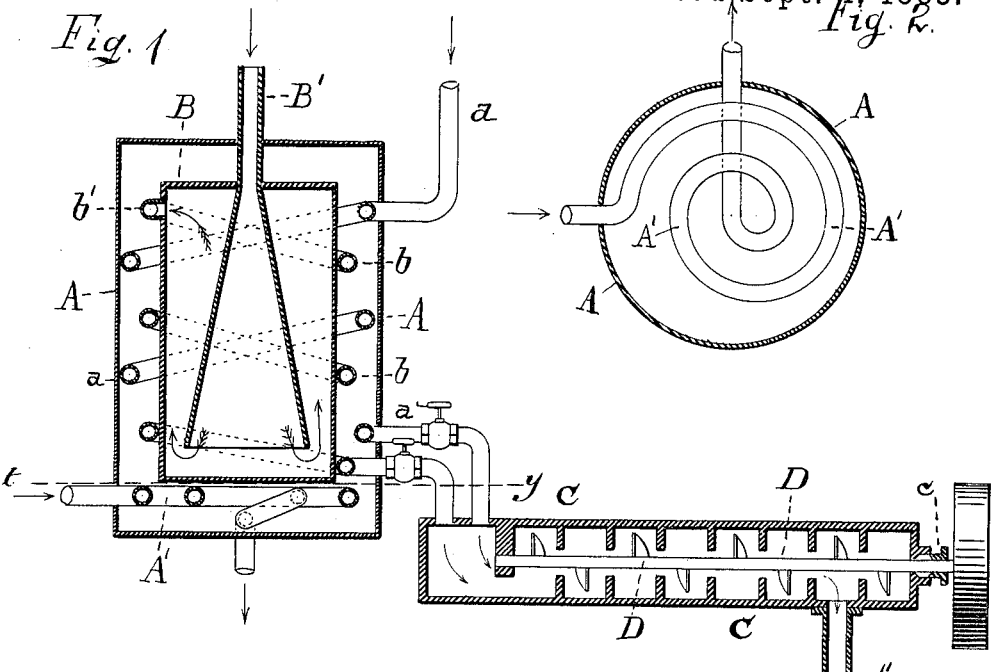
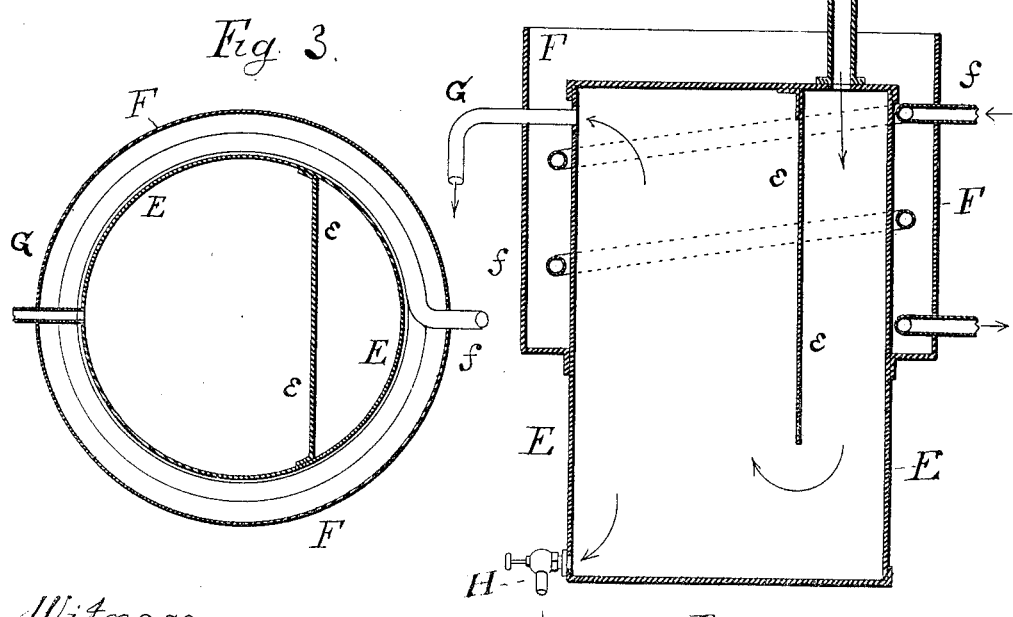
Witnesses
D. S. Greene
S. L. Hutchinson
Inventor
Edward D. Kendall

UNITED STATES PATENT OFFICE.

EDWARD D. KENDALL, OF BROOKLYN, NEW YORK.

PROCESS OF AND APPARATUS FOR PREPARING PETROLEUM-JELLY.

SPECIFICATION forming part of Letters Patent No. 284,437, dated September 4, 1883.

Application filed August 19, 1882. (No model.)

*To all whom it may concern:*

Be it known that I, EDWARD D. KENDALL, of the city of Brooklyn, county of Kings, and State of New York, have invented a new and useful Process of and Apparatus for Preparing a so-called "Petroleum - Jelly," which method is fully set forth in the following specification and accompanying drawings.

This invention relates to a class of soft unctuous solids composed of hydrocarbons and obtained from the residues that result from the partial distillation or natural evaporation of crude petroleum.

To prepare my new petroleum-jelly, I take the residue from the stills after the more volatile hydrocarbons and the so-called "paraffine-oils" have been volatilized from the crude petroleum, or I take the residue of similar character known as "rod-wax," and which sometimes results from the natural evaporation of crude petroleum, and treat either or both of the said residues in a suitable apparatus with hot alcohol of high proof (preferably containing not less than ninety-five per cent. of absolute alcohol) by heating the said residues and agitating them with the hot alcohol, whereby the latter dissolves a quantity of several mixed hydrocarbons, which it retains in solution after the subsidence and removal of the insoluble and cruder portions of the said residues and until the temperature of the alcohol shall have become greatly reduced, when the larger portion of the dissolved hydrocarbons is precipitated and may be separated from the alcohol, which alcohol is again heated and in like manner used again with fresh portions of the said residues from petroleum, and so repeatedly. The hydrocarbons that are precipitated, as stated, by the cooling of the alcoholic solution, after being permitted to stand for some time in the settling-tank, so as to allow the alcohol to completely separate from it, or, if necessary, may be again melted for the purpose of evaporating the alcohol, leaves a residue which constitutes my new petroleum-jelly.

The apparatus necessary to the manufacture of this petroleum-jelly, and whereby its production is made practicable on a commercial scale, is shown by the accompanying drawings, in which—

Figure 1 is a vertical sectional view of the essential parts of the said apparatus. Fig. 2 is a horizontal sectional view of tank A on the line *t y*, just below the interior receptacle, B, and Fig. 3 is a horizontal section of a part of the apparatus.

Similar figures refer to like parts.

A A is a covered iron tank, containing water heated by steam passing through a flat coil of pipe, A', placed near the bottom of the tank.

B is an inner closed vessel, supported in the position shown by suitable props and lateral braces, which are not represented. A pipe, B', passes through the top of the covered tank A A and the top of the closed vessel B, and reaches nearly to the bottom of the latter. The lower end of this pipe is gradually enlarged and of conical form. A coil of pipe, *b b*, surrounds the exterior of the vessel B, one end of which pipe connects with the interior of the said vessel at *b'*. The other end of the pipe passes through the side and near the bottom of the tank A A, and enters near one end of a horizontal cylinder, C C. The said pipe is provided with a cock at a point between the tank and the cylinder. A pipe, one end of which is shown at *a* and other parts of the same at *a' a'*, enters the tank A A near its upper end, and, passing in a coil near the inner sides of the tank, extends through the side of the tank near the bottom, and also terminates in connection with the cylinder C C. This pipe also is provided with a cock at a point between the cylinder and the tank.

C C is a cylindrical closed vessel, having at one end a stuffing-box, *c*, through which passes a shaft, D D. One end of this shaft is supported by a suitable bearing fastened within and near one end of the cylinder or said cylindrical vessel. The other and outer end of the shaft, supported by the stuffing-box, carries a driven wheel, by which it receives motion.

On the shaft D D, within the cylinder, are numerous projecting blades, that act as paddles when the shaft rotates. Other and alternate projections extend from the inner sides of the cylinder toward the shaft. The object of these blades and projections is to thoroughly mingle liquids within the cylinder C C. At one end of this cylinder, near the stuffing-box, there is an opening, from which a pipe, *c''*, extends to and connects with a covered tank, E E, the upper part of which tank is surrounded by a jacket, F F, containing water heated by steam that passes through a coil of pipe, $f f$.

At $e\ e$ is a partition extending across and near one side of the tank E, and also more than half-way to the bottom of the tank.

G is a pipe leading from an opening near the top of the tank E, and H is a large cock near the bottom of the tank.

The tank A and the jacket F are each provided with a thermometer, (not shown,) to indicate the temperature of the contained water, which should be the same in both the tank and the jacket and near the boiling-point of the alcohol employed.

The water being heated to the proper temperature, alcohol is admitted through the pipe $a'\ a'$ from any suitable reservoir to the cylinder C, the supply being regulated by the appropriate cock. At the same time the aforesaid residues from petroleum in a melted state are conducted from a proper receptacle through the pipe B' into the vessel B, and thence through the pipe $b\ b$ to the cylinder C, the required supply being adjusted by means of the cock pertaining to the pipe $b'$. The alcohol and the petroleum residues become sufficiently heated while passing through their respective pipes, are thoroughly commingled in the cylinder C, and are discharged together through the pipe $c''$ into the tank E. The partition $e\ e$ facilitates the separation of the alcoholic solution of hydrocarbons from the insoluble and cruder portion of the petroleum residues. The latter is drawn off continuously or otherwise by means of the cock H, and is available for other uses in the arts. The alcoholic solution, retained in a heated state by means of the water-jacket F, passes through the pipe G into any suitable cooling-receptacles, whence, after depositing the greater part of its contained hydrocarbons, it is to be pumped into its first-mentioned reservoir, to be used again in like manner as described, and so repeatedly.

What I claim as new, and desire to secure by Letters Patent, is—

1. The method of producing a substance from petroleum residues resembling somewhat the material known as "petroleum-jelly," and which process consists of the following steps: first, heating the said residues to nearly the boiling-point of alcohol, or to a temperature of about 170° degrees, if the alcohol has a specific gravity of .816, and simultaneously heating a larger volume of alcohol to substantially the same temperature; second, thoroughly commingling the said heated residues and alcohol by mechanical agitation; third, subjecting the substances thus combined to the action of gravity and differences of temperature for the purpose of separating the insoluble elements from the hot alcoholic solution; and, fourth, drawing off the alcoholic solution into a settling and cooling tank, where, during the operation of cooling, the alcohol rises to the surface and is drawn off, to be returned to the original circulation, while the jelly is left in the cooling and settling tanks, as hereinbefore set forth.

2. The combination of the tank A, the inner tank, B, provided with a delivery-tube, B', reaching nearly to the bottom of the tank B, means, as described, for heating the tanks, pipes $a$ and $b$, located and connected as described, whereby the alcohol and residuum are conveyed to the vessel $c$, with the vessel $c$, provided with an agitating device, all substantially as described.

3. The combination of tank E, provided with a partition, as set forth, the water-jacket F, enveloping the upper portion only of said tanks, means, as described, for heating the same, the cylinder C, provided with an agitator, D, and connected, as described, with the tank E, and devices, as described, for heating the alcohol and residuum and delivering them to the cylinder C, all substantially as set forth.

In testimony whereof I have hereunto set my hand and seal in the presence of two subscribing witnesses.

EDWARD D. KENDALL. [L. S.]

Witnesses:
D. S. GREENE,
S. L. HUTCHINSON.